United States Patent
Imai

[11] Patent Number: 6,040,037
[45] Date of Patent: Mar. 21, 2000

[54] LOW-RESISTANCE INTERCONNECTOR AND METHOD FOR THE PREPARATION THEREOF

[75] Inventor: Tsuyoshi Imai, Nagano-ken, Japan

[73] Assignee: Shin-Etsu Polymer Co., Ltd., Tokyo, Japan

[21] Appl. No.: 08/724,139

[22] Filed: Sep. 30, 1996

[30] Foreign Application Priority Data

Sep. 29, 1995 [JP] Japan ................................. 7-252846

[51] Int. Cl.$^7$ .............................. B32B 3/00; H01R 4/58; H01H 47/00
[52] U.S. Cl. ......................... 428/209; 439/91; 307/125
[58] Field of Search .................................. 357/67, 72, 80, 357/74; 428/201, 206, 209, 210, 247, 256, 304.4, 199, 300, 316, 294, 338, 408, 901; 361/414, 386, 398; 29/877, 876, 875, 878, 879; 439/55–77, 65, 66, 67, 86–91, 586–603; 174/262, 264; 307/125

[56] References Cited

U.S. PATENT DOCUMENTS

| | | | |
|---|---|---|---|
| 3,202,488 | 8/1965 | Ehrreich et al. | 29/162 |
| 3,971,610 | 7/1976 | Buchoff et al. | 397/17 R |
| 4,084,985 | 4/1978 | Evans | 136/89 |
| 4,754,546 | 7/1988 | Lee et al. | 29/877 |
| 4,808,112 | 2/1989 | Wood et al. | 439/66 |
| 4,954,873 | 9/1990 | Lee et al. | 357/72 |
| 5,281,771 | 1/1994 | Swift et al. | 174/262 |

*Primary Examiner*—Louise N. Leary
*Attorney, Agent, or Firm*—McAulay Nissen Goldberg Kiel & Hand, LLP

[57] ABSTRACT

Disclosed is a novel low-resistance interconnector used for electrically connecting two opposite arrays of electrode terminals on the respective electronic devices. The interconnector is an elongated integral body with three parts bonded together side-by-side consisting of two side parts made from an insulating rubber and a center layer sandwiched therebetween, which has a composite structure consisting of an insulating adhesive as the matrix and conductive elements embedded in the matrix in an array or in two opposite arrays aligned at a regular pitch in a running direction perpendicular to the flat surface formed by the three parts, each of the conductive elements in one of the two arrays just facing one of the conductive elements in the other array. The conductive elements are made from a conductive polymeric composition containing silver particles to have a specified volume resistivity. Efficient and highly productive methods are disclosed for the preparation of the interconnectors in which the conductive elements are arranged in a single array or in two opposite arrays.

10 Claims, 5 Drawing Sheets

LOW-RESISTANCE INTERCONNECTOR AND METHOD FOR THE PREPARATION THEREOF

BACKGROUND OF THE INVENTION

The present invention relates to a novel low-resistance interconnector and a method for the preparation thereof. More particularly, the invention relates to a low-resistance interconnector used for electrically connecting oppositely facing electrodes in arrays on two different electronic devices as in the electric connection between a glass substrate plate and a printed circuit board of a liquid-crystal display device, between two electronic circuit boards and between an IC chip and an inspection instrument thereof as well as to an improved method for the preparation thereof.

As is known, several types of interconnectors are currently used with the above mentioned object to establish electric connection between two arrays of electrode terminals on two electronic unit devices. One of the most important classes of interconnectors include those belonging to the so-called zebra type interconnectors, in which the principal part is an integral elongated piece consisting of an alternate stratification of layers of an electroconductive rubber and layers of electrically insulating rubber stacked one on the other in the lengthwise direction as is disclosed in Japanese Patent Kokai 50-94495. Most conventional interconnectors of the other class are those belonging to the class of the so-called anisotropically electroconductive interconnectors consisting of a sheet of an insulating rubber as the matrix and a multiplicity of very fine metal filaments embedded in the matrix as aligned to run in the direction, typically, perpendicular to the surface of the sheet as is disclosed in Japanese Patent Kokai 53-5147991.

These conventional interconnectors have their own advantages and disadvantages. For example, a zebra-type interconnector has a problem that, since the integral elongated piece consisting of an alternation of conductive and insulating rubber layers is prepared by slicing an alternately laminated block of these two different layers into sheets followed by chopping of the sliced sheets into elongated pieces, occurrence of a "skew" in slicing and chopping is more or less unavoidable resulting in a decrease in the dimensional accuracy of the interconnector so that the interconnector is not suitable for use in the electric connection of electrode arrays in a very fine pitch of the electrode arrangement. In addition, the volume resistivity of the electroconductive rubber layers cannot be low enough so that the electric resistance between two electrode terminals connected therewith is necessarily high and cannot be uniform and the electric current passing through the layer of the conductive rubber is limited, for example, not to exceed 10 mA since a larger current necessarily results an undue temperature increase in the interconnector to decrease the stability of electric connection with the interconnector. When IC chips and similar chips having a great number of electrode terminals in an electrode array are to be electrically connected with an interconnector, moreover, uniformity and reliability of electric connection can be ensured only by increasing the contacting pressure between the interconnector and the electrode arrays so that the overall load on the electrode terminals of the IC chip or on the inspection instrument is necessarily increased.

An anisotropically electroconductive interconnector, on the other hand, has different problems and disadvantages. For example, the fine metal filaments embedded in the rubbery matrix are liable to cause buckling by repeating bending and stretching so that the interconnector is not suitable, for example, in an inspection instrument for IC chips in which one and the same interconnector is used repeatedly for a large number of IC chips. Reliability of electric contacting between the end points of all of the fine metal filaments and the electrode terminals can be ensured only by increasing the contacting pressure between the interconnector and the electrode terminals resulting in overloading on the electrode terminals of the IC chip or on the inspection instrument. The end points of the fine metal filaments usually have no flat and uniform surface so that the fine metal filaments and the electrode terminal are connected only by point-contacting sometimes resulting in an incomplete electric connection. In addition, it is sometimes necessary to provide a plating layer of gold on the end point surface or over the whole surface of each of the fine metal filaments in order to decrease the contact resistance between the metal filaments and the electrode terminals or to ensure stability in the embedded condition of the metal filaments in the rubbery matrix.

Although conventional zebra-type interconnectors can be used for the electric connection of a semiconductor device having a high input impedance such as field-effect transistors and similar transistors where the continuity current is consequently small with a negligibly small voltage drop and heat generation even when the internal resistance of the interconnector is relatively large, they cannot be used when a low internal resistance of the interconnector is essential as in the electric connection of a color liquid-crystal module and a black-and-white liquid-crystal module of 16 gradations or more, when it is desired to have the resistance values of the electroconductive layers as uniform as possible or when a relatively large electric current is to be passed through the interconnector as in the plasma display modules and in the electric connection of a power circuit and similar power circuits.

SUMMARY OF THE INVENTION

The present invention accordingly has an object to provide a novel and improved interconnector free from the above described problems and disadvantages in the conventional interconnectors of the prior art as well as an efficient industrial method for the preparation of such improved interconnectors.

Thus, the low-resistance interconnector provided by the present invention is an integral elongated strip of a sheet having flat surfaces and consisting of three elongated sectional parts conjoined together side-by-side to form the flat surface of the sheet including two side sectional parts and one center sectional part sandwiched between the side sectional parts, the side sectional parts being made each from an electrically insulating rubbery elastomer and the center sectional part being a composite body consisting of an electrically insulating adhesive as a matrix and a plurality of electroconductive elements embedded in the matrix in parallel each to the others arranged in an array or in two arrays running in the direction perpendicular to the flat surface of the strip of sheet at a regular pitch and made from an electroconductive polymeric composition consisting of a polymeric matrix and silver particles dispersed therein and having a volume resistivity in the range from $2 \times 10^{-4}$ to $5 \times 10^{-4}$ ohm.cm, the end points of each of the electroconductive elements appearing on the flat surfaces of the strip.

The low-resistance interconnector of the present invention defined above having a single array of the electroconductive elements is prepared by the inventive method which comprises the steps of:

(a) forming, on one surface of a first sheet of an electrically insulating rubbery elastomer, an array of stripes made from an electroconductive polymeric composition consisting of a polymeric matrix and silver particles dispersed therein and having a volume resistivity in the range from $2\times10^{-4}$ to $5\times10^{-4}$ ohm.cm at a regular pitch;

(b) coating the surface of the first sheet of an electrically insulating rubbery elastomer and the array of parallel stripes made from an electroconductive polymeric composition thereon altogether with an electrically insulating adhesive to form a layer consisting of the electrically insulating adhesive as a matrix and the stripes made from the electroconductive polymeric composition embedded in the matrix to form a two-layered composite sheet;

(c) overlaying and adhesively bonding a second sheet of an electrically insulating rubbery elastomer on and to the surface of the layer consisting of the electrically insulating adhesive as a matrix and the stripes made from the electroconductive polymeric composition embedded in the matrix to form a three-layered composite sheet; and (d) slitting the three-layered composite sheet into strips in the planes substantially perpendicular to the running direction of the stripes made from the electroconductive polymeric composition.

While the above described process is for the preparation of a low-resistance interconnector with a single array of the electroconductive elements, a low-resistance interconnector having the electroconductive elements arranged in two arrays can be prepared in a process which comprises the steps of:

(a) forming, on one surface of each of a first and second sheets of an electrically insulating rubbery elastomer, an array of stripes made from an electroconductive polymeric composition consisting of a polymeric matrix and silver particles dispersed therein and having a volume resistivity in the range from $2\times10^{-4}$ to $5\times10^{-4}$ ohm.cm at a regular pitch;

(b) coating the surface of each of the first and second sheets of an electrically insulating rubbery elastomer and the array of parallel stripes made from an electroconductive polymeric composition thereon altogether with an electrically insulating adhesive to form a layer consisting of the electrically insulating adhesive as a matrix and the stripes made from the electroconductive polymeric composition embedded in the matrix to form a first and second two-layered composite sheets;

(c) overlaying the first and second two-layered composite sheets one on the other and bonding the composite sheets together at the surfaces of the respective layers consisting of the electrically insulating adhesive as a matrix and the stripes made from the electroconductive polymeric composition embedded in the matrix to form a multilayered composite sheet in such a fashion that each of the electroconductive stripes on the first two-layered composite sheet just faces one of the electroconductive stripes on the second two-layered composite sheet; and (d) slitting the multilayered composite sheet into strips in the planes substantially perpendicular to the running direction of the stripes made from the electroconductive polymeric composition.

BRIEF DESCRIPTION OF THE DRAWING

FIG. 1 shows perspective views 1A and 1B of the inventive low-resistance interconnector having the electroconductive elements arranged in a single array and in two arrays, respectively.

DETAILED DESCRIPTION OF PREFERRED EMBODIMENTS

The low-resistance interconnector of the invention having the above described unique structure and the inventive method for the preparation thereof are illustrated in detail by making reference to the accompanying drawing.

Figure 1A:
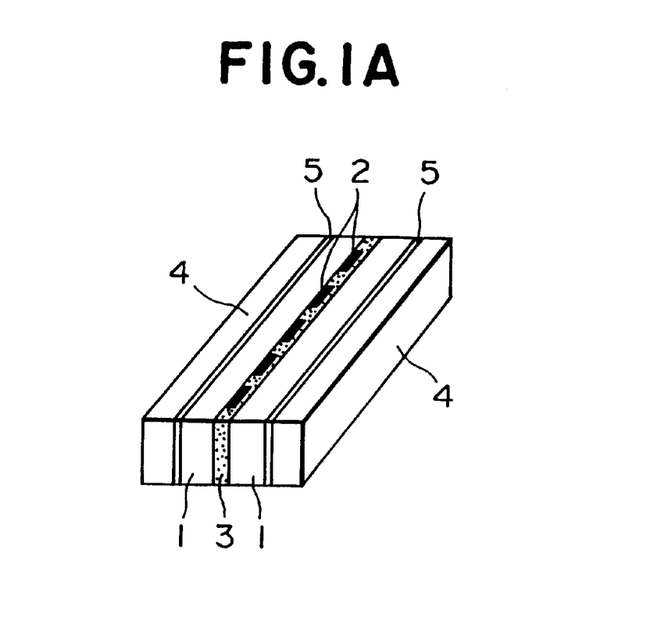

The inventive low-resistance interconnector illustrated in FIG. 1A by a perspective view having electroconductive elements 2 arranged in a single array is an integral elongated strip of sheet having a flat surface and consists of three elongated sectional parts including two side sectional parts 1, 1 made from an electrically insulating rubbery elastomer and a center or electroconductive sectional part 3 sandwiched by the two side sectional parts 1, 1 side-by-side. The center sectional part 3 per se has a composite structure consisting of a matrix of an electrically insulating adhesive and a plurality of the electroconductive elements 2 embedded in the matrix. The electroconductive elements 2 are arranged in an array, usually, at a regular pitch and each of the electroconductive elements 2 runs in the direction substantially perpendicular to the flat surface of the integral body. The electroconductive elements 2 are formed from an electroconductive polymeric composition comprising a polymeric resin and particles of silver uniformly dispersed in the polymeric resin in such an amount that the electroconductive polymeric composition has a volume resistivity in the range from $2\times10^{-4}$ to $5\times10^{-4}$ ohm.cm at room temperature.

Though not essential, it is advantageous that the above described low-resistance interconnector of the invention consisting of three sectional parts 1, 3, 1 bonded together side-by-side is provided, as is illustrated in FIG. 1A, on the outer surfaces of the side sectional parts 1, 1 with reinforcing support members 4, 4 bonded to the side surface of the respective side sectional parts 1, 1 with intervention of a layer of an adhesive 5, 5. These reinforcing support members 4,4 have an effect to increase uniformity in the compression of the inventive low-resistance interconnector under a compressive force and to prevent collapsing of the interconnector under an unduly large compressive force so as to improve the workability in the assemblage works with the interconnectors and to ensure reliability of electric connection therewith.

Figure 1B:
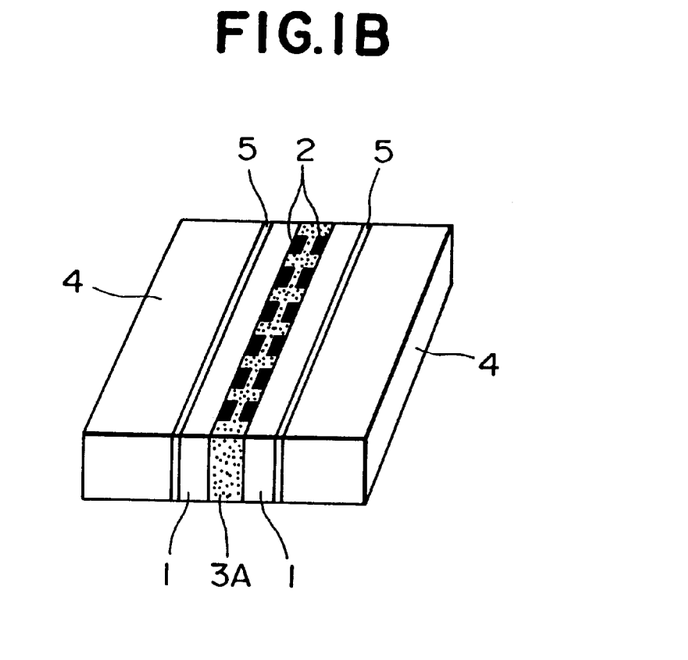

FIG. 1B is a perspective view of the inventive low-resistance interconnector of another embodiment, in which the center sectional part 3A sandwiched between two side sectional parts 1, 1 has the electroconductive elements 2 arranged in two arrays in such a fashion that each of the electroconductive elements 2 in one of the arrays just faces one of the electroconductive elements 2 in the other array of the elements 2 with a layer of the adhesive intervening therebetween, the structure of the interconnector otherwise being identical with that illustrated in FIG. 1A. The low-resistance interconnector with such a dual arrangement of the electroconductive elements 2 is advantageous in respect of the increase in the stability and reliability of electric connection and an increase in the capacity for a large electric current.

The electrically insulating rubbery elastomer forming the side sectional parts 1, 1 is selected preferably from those having curability by forming crosslinks such as silicone rubbers, polybutadiene rubbers, natural rubber, polyisoprene rubbers, polyurethane rubbers, polychloroprene rubbers, polyester rubbers, butadiene-styrene copolymeric rubbers, butadiene-acrylonitrile copolymeric rubbers, butadiene-isobutylene copolymeric rubbers, epichlorohydrin rubbers, polysulfide rubbers and the like, of which silicone rubbers are particularly preferred in respects of their excellent electric properties and high heat resistance as well as the low permanent compression set. It is desirable that the silicone rubber as cured has a rubber hardness approximately identical with that of the electroconductive composition forming the electroconductive elements 2 and not lower than 60° H. as specified in JIS in order to ensure uniformity in the electric connection with the interconnector even when the contacting pressure between the interconnector and the electrode terminals is very small and to effectively prevent collapsing of the interconnector under an unduly large compressive force.

The center sectional part 3 has a composite structure consisting of a matrix formed from an adhesive and a plurality of electroconductive elements 2 embedded in the matrix. The electroconductive elements 2 are formed by curing a polymeric composition having a viscosity in the range from 300 poise to 500 poise as prepared by blending, for example, 100 parts by weight of a curable organopolysiloxane resin and from 300 to 400 parts by weight of a powder of metallic silver consisting of flaky or globular particles having a particle diameter in the range from 0.1 µm to 10 µm.

The adhesive forming the matrix of the center sectional part 3 or 3A serves as an insulator between the electroconductive elements 2 embedded therein so that it is essential that the adhesive has a high volume resistivity in the range, for example, from $1 \times 10^{13}$ to $4 \times 10^{14}$ ohm.cm. It is further desirable that, if available, the adhesive has flame retardancy to meet the requirements for the grade of V-0 or V-1 according to the UL 94 standards.

When the inventive low-resistance interconnector is provided with reinforcing support members 4, 4 on both sides of the side sectional parts 1, 1 as is illustrated in FIGS. 1A and 1B, the reinforcing support members 4, 4 are made from an electrically insulating rubbery elastomer such as silicone rubbers having a rubber hardness of 20 to 50° H. because the material should have a relatively low compressive modulus to give an adequate amount of compression required to ensure a stable contacting condition between the electroconductive elements 2 and the surface of an electrode terminal even under a small compressive load on the interconnector. The reinforcing support member 4 is adhesively bonded to the side surface of the side sectional part 1 with intervention of a layer 5 of an adhesive which can be the same one as that forming the matrix of the center sectional part 3 or 3A.

In the following, the method for the preparation of the low-resistance interconnector as illustrated in FIG. 1A is described by making reference to FIG. 2 of the accompanying drawing schematically illustrating the steps of the preparation procedure.

The electrically insulating rubber composition to form one of the side sectional parts 1, 1 is first shaped by compression molding or other suitable molding means in the form of a thin layer 12 having a thickness of 0.1 to 0.5 mm on a continuous-length carrier sheet 11 of a plastic resin such as, for example, a low-shrinkage poly(ethylene terephthalate) resin drawn out from the roll 10 by unrolling and running like a conveyor belt. The layer 12 can be shaped in the form of a continuous belt or, preferably, in the form of square or rectangular unit sheets 12 successively running one by one by keeping appropriate gaps with the preceding and succeeding unit sheets.

Figure 2:
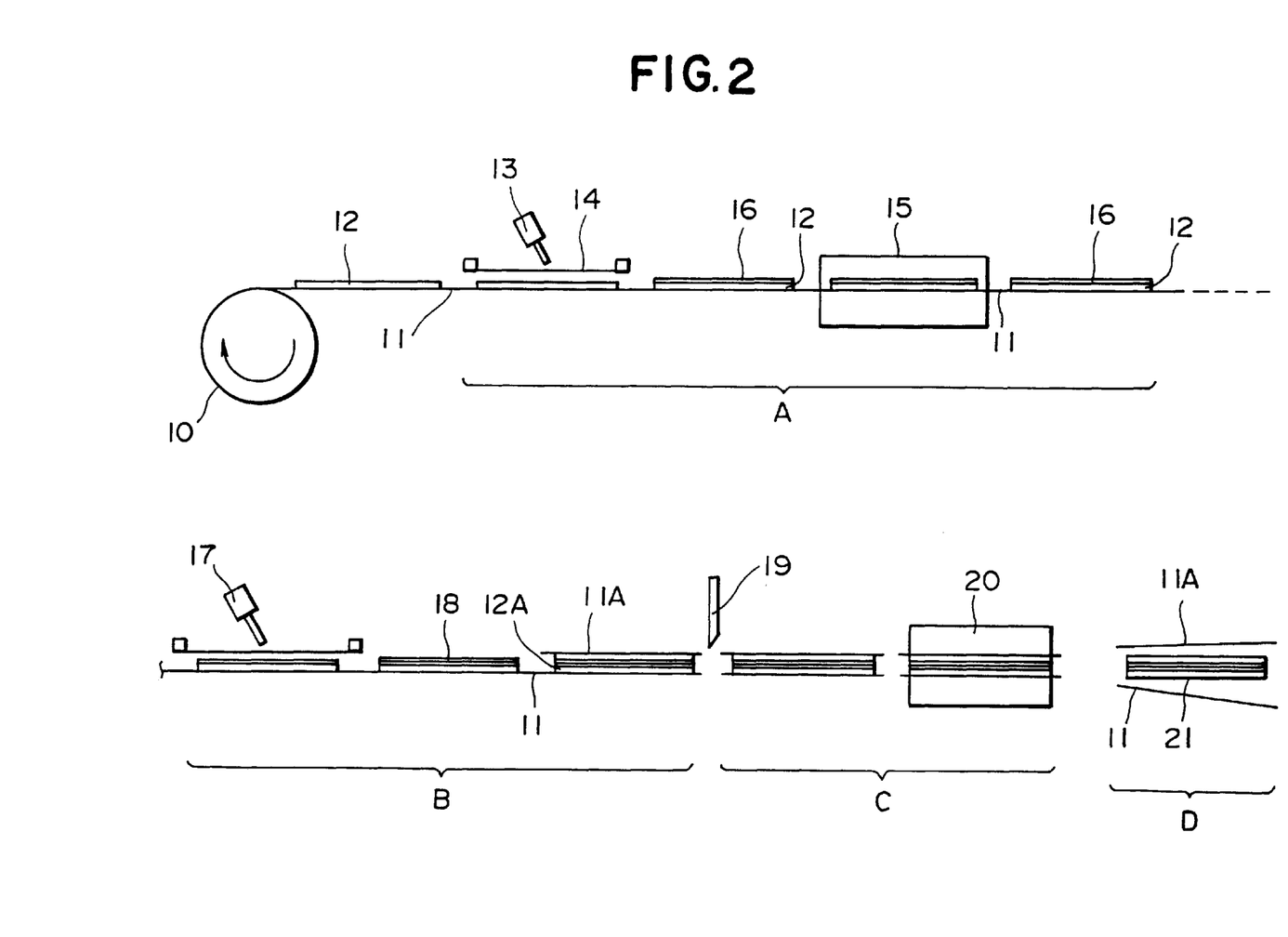
FIG. 2 is a sequential schematic illustration of the steps for the preparation of the inventive low-resistance interconnectors.

In stage A of the process illustrated in the upper half of FIG. 2, screen printing through a screen 14 is performed on the surface of the insulating rubber layer 12 to form printed stripes 16 running in the lengthwise direction of the carrier sheet 11 at a regular pitch with an electroconductive pasty resinous composition 13 containing silver particles. Although the thickness, width and pitch of the thus formed striped layers 16 of the electroconductive resinous composition naturally depend on the particularly intended application of the interconnector, the thickness of the layers 16 is in the range from 10 to 100 µm, width of each stripe 16 is at least 0.18 mm or, preferably, at least 0.20 mm and the pitch of the stripes 16 is at least 0.4 mm in consideration of the productivity of screen printing, limitation in the accuracy or resolution of the screen printing method and arrangement pitches of the electrode terminals to be electrically connected with the inventive low-resistance interconnector.

Figure 3A:
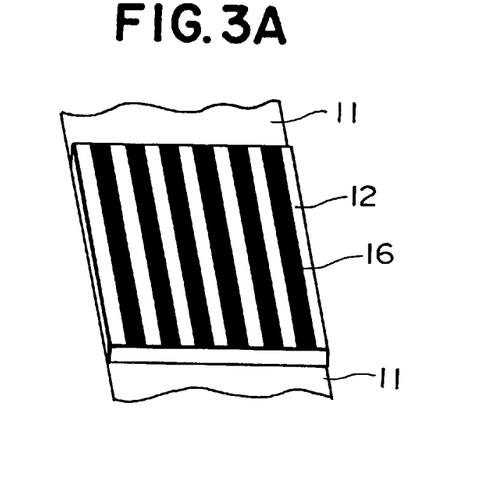
FIGS. 3A and 3B are each a perspective view of the intermediate product obtained in stage A and in stage B, respectively, of the process illustrated in FIG. 2.

The insulating rubber sheet 12 carried by the carrier sheet 11 and provided with the stripes 16 of the silver particle-containing electroconductive composition 13 is then introduced into a curing oven 15 in which the electroconductive composition 13 is cured by heating to give stripes 16 of the cured electroconductive composition. FIG. 3A illustrates a perspective view of the thus obtained unit sheet 12 carried on the carrier sheet 11 and provided with stripes 16 of the cured electroconductive resinous composition as an intermediate product.

Figure 3B:
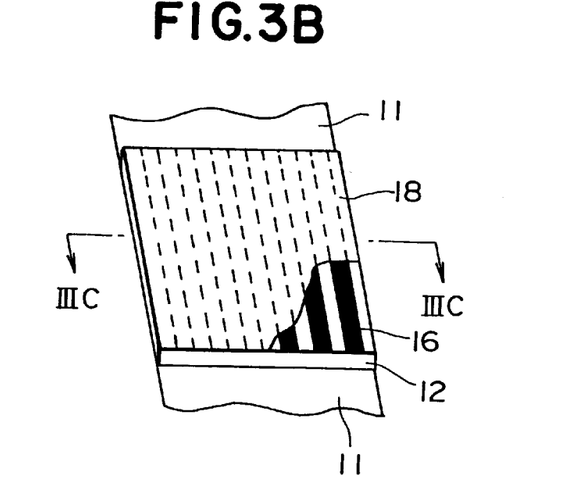
Figure 3C:
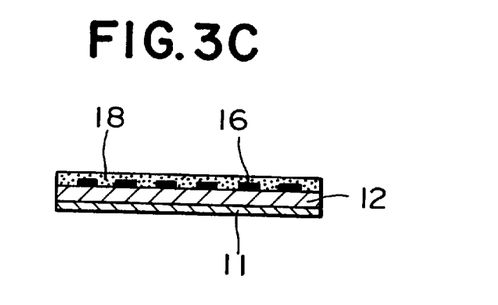
FIG. 3C is a cross sectional view of the intermediate product illustrated in FIG. 3B as cut and viewed along the direction shown by the arrows IIIC—IIIC.

In stage B illustrated in the lower part of FIG. 2, a second screen printing is performed with an adhesive 17 to form a coating layer 18 of the adhesive 17 on allover the surface of the insulating rubber sheet 12 and the stripes 16 of the cured electroconductive resinous composition. FIG. 3B illustrates a perspective view of the thus obtained unit sheet of the insulating rubber 12 carried by the carrier sheet 11 and provided with stripes 16 of the electroconductive resinous composition and the adhesive layer 18 covering allover the surface of the rubber sheet 12 and the electroconductive stripes 16 (the adhesive layer 18 partially removed) as a further intermediate product. FIG. 3C illustrates a cross sectional view of the unit sheet illustrated in FIG. 3B as cut and viewed along the direction indicated by the arrows IIIC—IIIC in FIG. 3B. Thereafter, a second unit sheet 12A of the insulating rubber having dimensions approximately equivalent to the first unit rubber sheet 12, which preferably is also supported by a carrier sheet 11A, is overlaid on the adhesive layer 18.

In stage C of the process illustrated in FIG. 2, the insulating unit rubber sheet 12 is separated from the succeeding unit sheet by cutting the carrier sheet 11 with a cutter blade 19 to give a separate unit sheet consisting of two insulating rubber layers 12, 12A and a layer 18 of an adhesive interposed between the two insulating rubber layers 12, 12A and embedding stripes 16 of the electroconductive cured resinous composition containing silver particles. Each of the insulating rubber sheets 12, 12A is lined with the carrier sheet 11, 11A.

In the next place, in stage C, the thus obtained unit sheet of the layered structure is subjected to an integration treatment by compressing in a hot press 20 so as to effect adhesive bonding between the adhesive layer 18 and the insulating rubber layer 12A. In stage D to follow, the carrier sheets 11, 11A as a ling of the respective insulating unit rubbery sheets 12, 12A are removed by peeling to give an integral three-layered unit sheet 21 which is slitted in planes substantially perpendicular to the running direction of the stripes 16 into strips of an appropriate width, which is the thickness of the interconnector illustrated in FIG. 1A, elongated in the direction within the plane defined by the stripes 16 and perpendicular to the running direction of the electroconductive stripes 16 to serve as the electroconductive elements 2 in FIG. 1A embedded in the adhesive layer 3 at a uniform pitch. When a low-resistance interconnector of the invention having the reinforcing support members 4,4 on the side surfaces of both of the side sectional parts 1, 1 as is illustrated in FIG. 1A is desired, the integrally layered unit sheet 21 after removal of the carrier sheets 11, 11A is, prior to slitting into strips, sandwiched by two insulating rubber sheets 4, 4 with intervention of an adhesive layer 5 therebetween.

Figure 4:
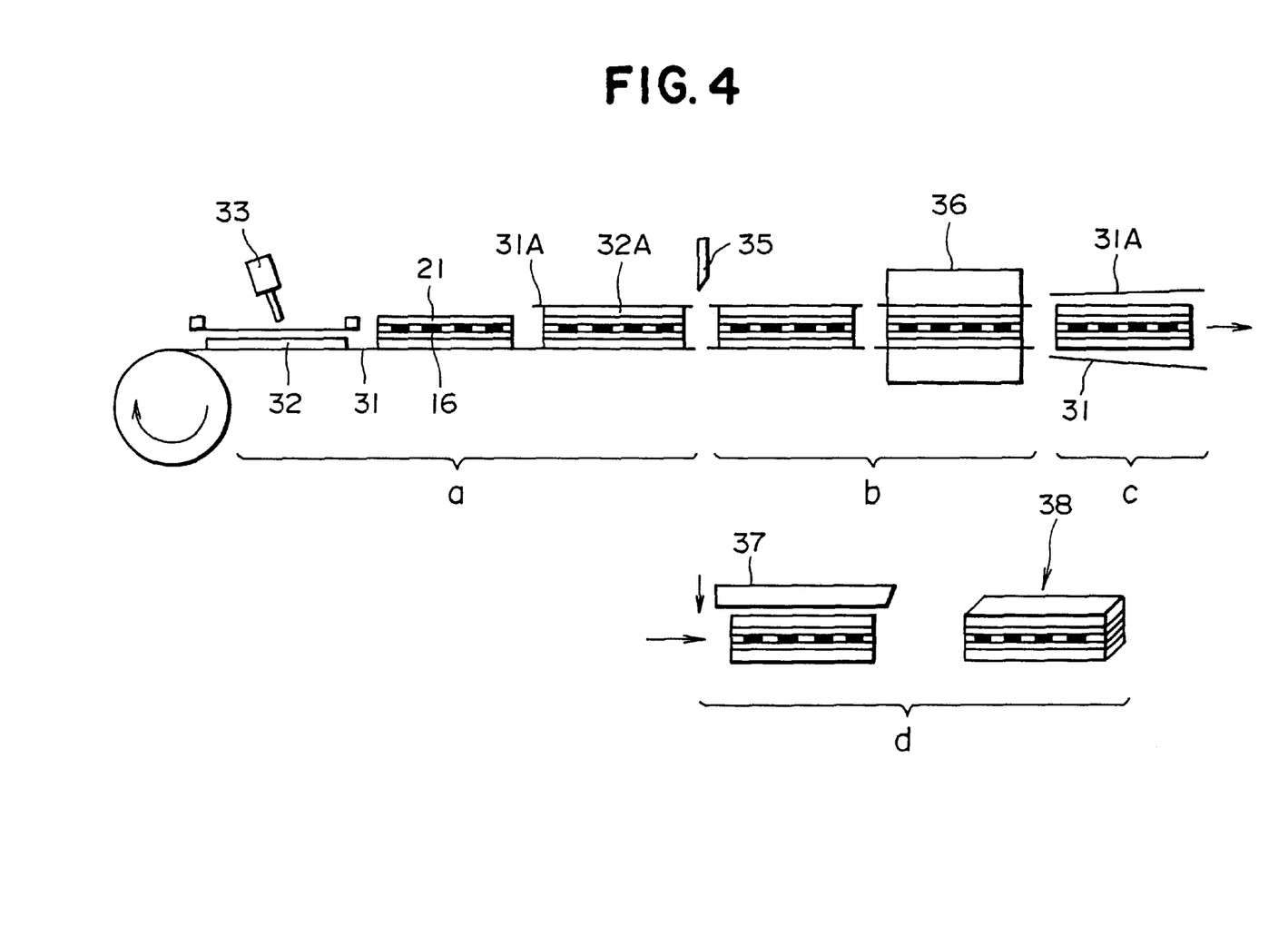
FIG. 4 is a sequential schematic illustration of the steps for the preparation of the inventive low-resistance interconnectors according to a different embodiment.

The low-resistance interconnector of the invention provided with reinforcing support members 4, 4 as is illustrated in FIG. 1A can be prepared in a modified procedure illustrated in FIG. 4 of the accompanying drawing. Thus, in stage a, a unit sheet 32 of an insulating rubber carried by a continuous-length carrier sheet 31 is coated, for example, by screen printing with an adhesive 33 to form an adhesive layer which corresponds to the adhesive layer 5 in FIG. 1A and the three-layered unit sheet 21 after removal of the carrier sheets 11, 11A obtained in stage D of the process illustrated in FIG. 2 is overlaid thereon. Thereafter, the surface of the three-layered sheet 21 is coated with an adhesive and a second unit sheet 32A of the insulating rubber lined with a carrier sheet 31A is laid thereon. In stage b, the carrier sheet 31 is cut with a cutter blade 35 along the gap between two sheets 32 to separate the layered body from the succeeding one followed by integration of the layers by compression in a hot press 36. In stage c, the carrier sheets 31, 31A are removed by peeling from the layered body. In stage d, the thus obtained integrally layered body is slitted with a slitting blade 37 to give strips 38 elongated in the direction perpendicular to the running direction of the stripes 16 as the low-resistance interconnectors of the invention illustrated in FIG. 1A.

The above described procedure for the preparation of the low-resistance interconnector illustrated in FIG. 1A can be modified so as to give an interconnector of a different embodiment as illustrated in FIG. 1B by a perspective view in which a plurality of the electroconductive elements 2 embedded in the center sectional part 3A are arranged in two arrays in such a fashion that each of the electroconductive elements 2 in one array just faces one of the electroconductive elements 2 in the other array. Namely, the procedure is substantially the same as in the above described procedure down to the preparation of the unit sheet 12 of an insulating rubber provided with stripes 16 of the electroconductive resinous composition and an overall coating layer 18 of an adhesive in stage B illustrated in FIG. 2. Instead of overlaying a plain unit sheet 12A of the insulating rubber lined with a carrier sheet 11A onto the adhesive coating layer 18 on the first unit rubber sheet 12, another unit rubber sheet provided with stripes of the electroconductive resinous composition and an overall coating layer of an adhesive is prepared and overlaid at the adhesive layer thereof on the adhesive layer 18 of the first insulating unit rubber sheet 12, optionally with interposition of another thin sheet of an insulating rubber therebetween, in such a fashion that each of the electroconductive stripes on the second insulating unit rubber sheet just faces one of the electroconductive stripes 16 on the first insulating unit rubber sheet 12 followed by integration in a hot press 20. The above mentioned optionally interposed thin layer of an insulating rubber between the adhesive coating layers, though not shown in FIG. 1B, has an effect to increase the reliability of electric insulation between the oppositely positioned electroconductive elements 2 and to prevent lateral displacement of the electroconductive elements 2 under compression leading to eventual contacting between adjacent elements 2.

In the following, more detailed descriptions are given by way of Examples to illustrate the inventive low-resistance interconnector and the method for the preparation thereof.

EXAMPLE 1

An electrically insulating silicone rubber composition prepared by uniformly blending 100 parts by weight of a commercial silicone rubber compound (SE 1188U, a product by Toray Silicone Corp.) with 0.012 part by weight and 2 parts by weight of curing agent mixtures Cat-P1-2 and C-19B (each a product by Shin-Etsu Chemical Co.), respectively, was shaped successively into 300 mm by 300 mm square sheets of 0.2 mm thickness having a rubber hardness of 70° H. by using a hot press on a continuous-length poly(ethylene terephthalate) film of 400 mm width and 0.1 mm thickness as a carrier sheet with regular gap zones between adjacent squares.

In the next place, screen printing was performed on each of the thus formed squares of the insulating silicone rubber layer in a pattern of stripes having a stripe width of 0.2 mm arranged at a regular pitch of 0.4 mm with an electroconductive silicone rubber composition prepared by blending 100 parts by weight of an insulating silicone rubber composition with 400 parts by weight of flaky silver particles of 6 $\mu$m diameter in a printing thickness of 50 $\mu$m and the stripes of the electroconductive silicone rubber composition were heated on the insulating silicone rubber layer supported by the carrier sheet at 150° C. for 5 minutes by passing the carrier sheet through a tunnel oven. The thus cured electroconductive silicone rubber in stripes had a rubber hardness of 75° H. and a volume resistivity of $4 \times 10^{-4}$ ohm.cm and adhesive bonding thereof to the underlying insulating silicone rubber sheet was good.

Further, a whole-surface coating layer was formed by screen printing on the insulating square silicone rubber sheet and the stripes of the electroconductive silicone rubber-based composition thereon with a silicone rubber-based liquid adhesive composition in a coating thick-ness of 30 $\mu$m on the surface of the electroconductive stripes and 80 $\mu$m on the surface of the same insulating silicone rubber sheet. Thereafter, 300 mm by 300 mm square sheets of the insulating silicone rubber composition having a thickness of 0.2 mm separately prepared on a carrier sheet were overlaid on the adhesive layer and, after cutting of the continuous-length carrier sheet along the gaps between the consecutively formed squares to give individual squares, cured and adhesively bonded by heating at 120° C. for 2 minutes in a hot press followed by removal of the carrier sheets by peeling to give a three-layered integral structure consisting of two insulating silicone rubber sheets and a layer sandwiched therebetween consisting of an adhesive as a matrix and stripes of the conductive silicone rubber-based composition embedded in the matrix.

Separately, 300 mm by 300 mm square sheets of 2 mm thickness were shaped from an electrically insulating silicone rubber composition capable of giving a low-hardness silicone rubber of 35° H. rubber hardness by curing (KE 1983A/B, a product by Shin-Etsu Chemical Co.) consecutively on a 400 mm wide continuous-length poly(ethylene terephthalate) film of 0.1 mm thickness as a carrier sheet with regular gap spaces and, after coating the square surface with an adhesive by screen printing in a coating thickness of 30 $\mu$m, the above prepared square sheets of the three-layered structure were overlaid on each of the adhesive layers and, further thereon, 300 mm by 300 mm square sheets of the same low-hardness silicone rubber composition having a thickness of 2 mm lined with a carrier sheet and coated with the adhesive in a thickness of 30 $\mu$m were overlaid to give a multilayered structure which was, after cutting the continuous-length carrier sheets to give individual squares, heated in a hot press at 120° C. for 2 minutes to effect curing of the low-hardness silicone rubber layers and integral bonding thereof to the three-layered structure with intervention of the adhesive layers therebetween followed by removal of the carrier sheets by peeling.

The thus obtained multilayered integral sheet, which consisted of two low-hardness silicone rubber layers of each 2 mm thickness to serve as the reinforcing support members 4, 4 and, as sandwiched therebetween with intervention of 30 $\mu$m thick adhesive layers 5, 5, the three-layered integral sheet consisting of two 0.2 mm thick silicone rubber layers to serve as the side sectional parts 1, 1 and, as sandwiched therebetween, a 80 $\mu$m thick adhesive layer to serve as the center sectional part 3 containing stripes of the electroconductive silicone rubber-based composition embedded therein to serve as the electroconductive elements 2, was slitted in a width of 2.5 mm in planes perpendicular to the running direction of the stripes into elongated strips as the low-resistance interconnector of the present invention provided with two reinforcing support members as is illustrated in FIG. 1A.

The low-resistance interconnector above obtained was sandwiched between 0.5 mm pitch arrays of electrode terminals on two circuit boards under a varied compression and the continuity resistance was measured between the opposite electrode terminals to find that stability or uniformity of the resistance was best when the compression was 5 to 10% with an average value of 350 mohm and the tolerable maximum current between a pair of electrode terminals could be as large as 160 mA. Curve I in FIG. 5 of the accompanying drawing shows the average value of the continuity resistance between pairs of opposite electrode terminals connected with the interconnector as a function of % compression.

A comparative performance test of the above described inventive low-resistance interconnector, referred to as the interconnector I hereinafter, was undertaken to make comparisons with a conventional interconnector of the so-called zebra type, referred to as the interconnector II hereinafter, and another conventional interconnector of the anisotropic conductivity type with fine metal filaments in alignment, referred to as the interconnector III hereinafter, each having a length of 100 mm and thickness of 2.5 mm. Other characterizing parameters of the respective interconnectors were as follows.

Interconnector I: pitch of electroconductive elements 0.4 mm; width 0.5 mm (excepting reinforcing support members); volume resistivity of conductive layer $4 \times 10^{-4}$ ohm.cm Interconnector II: pitch of electroconductive/insulating layer lamination 0.05 mm; width of conductive layer 0.5 mm; volume resistivity of conductive layer 0.5 ohm.cm Interconnector III: diameter of metal filaments, gold-plated 40 $\mu$m; pitch of metal filament arrangement 0.10 mm; width of conductive layer 0.2 mm; volume resistivity of conductive layer $3 \times 10^{-6}$ ohm.cm In the measurement of the above mentioned apparent volume resistivity of the respective conductive layers, the interconnector was sandwiched between two arrays of gold-plated copper electrode terminals of each 0.14 mm width arranged at a pitch of 0.28 mm under 10% compression in the direction of thickness and records were made also of the continuity resistance in ohm, difference between the maximum and minimum values of the resistance between each pair of oppositely facing electrode terminals, referred to as the resistance range hereinafter, in ohm and the maximum capacity for electric current. The results are shown in the table below.

TABLE

| Interconnector | I | II | III |
|---|---|---|---|
| Continuity resistance, ohm | $350 \times 10^{-3}$ | 470 | $20 \times 10^{-3}$ |
| Resistance range, ohm | $200 \times 10^{-3}$ | 350 | $30 \times 10^{-3}$ |
| Maximum current, mA | 150 | 10 | 400 |

EXAMPLE 2

An electrically insulating silicone rubber layer in 30 mm by 30 mm squares having a thickness of 0.2 mm was formed with regular gaps from the same insulating silicone rubber composition as prepared and used in Example 1 on a 0.1 mm thick continuous length poly(ethylene terephthalate) film of 400 mm width as the carrier sheet in the same manner as in Example 1. Thereafter, screen printing was performed on the surface of the insulating silicone rubber squares to form stripes of the same electroconductive silicone resin composition and whole-surface coating with the same adhesive was undertaken in just the same manner as in Example 1 followed by cutting of the carrier sheet along the gaps between adjacent squares to give individual squares of the insulating silicone rubber layer.

Two of the thus obtained squares of the insulating silicone rubber layer each supported on the carrier sheet were overlaid one on the other in such a fashion that each of the electroconductive stripes on one of the squares just faced one of the conductive stripes on the other of the squares with a layer of the adhesive intervening therebetween and the thus obtained multilayered structure was heated in a hot press to give an integral multilayered sheet from which the carrier sheets were removed by peeling.

The integral multilayered sheet was sandwiched between and integrated with two insulating low-hardness silicone rubber sheets of 2.0 mm thickness each supported on a carrier sheet in the same manner as in Example 1 by means of an adhesive followed by removal of the carrier sheets and slitting of the sheet in planes perpendicular to the running direction of the stripes into elongated strips of 2.5 mm width as the low-resistance interconnectors illustrated in FIG. 1B by a perspective view in which the electroconductive elements 2 were arranged in two oppositely facing arrays as embedded in the matrix of the adhesive to form the conductive layer 3.

Figure 5:
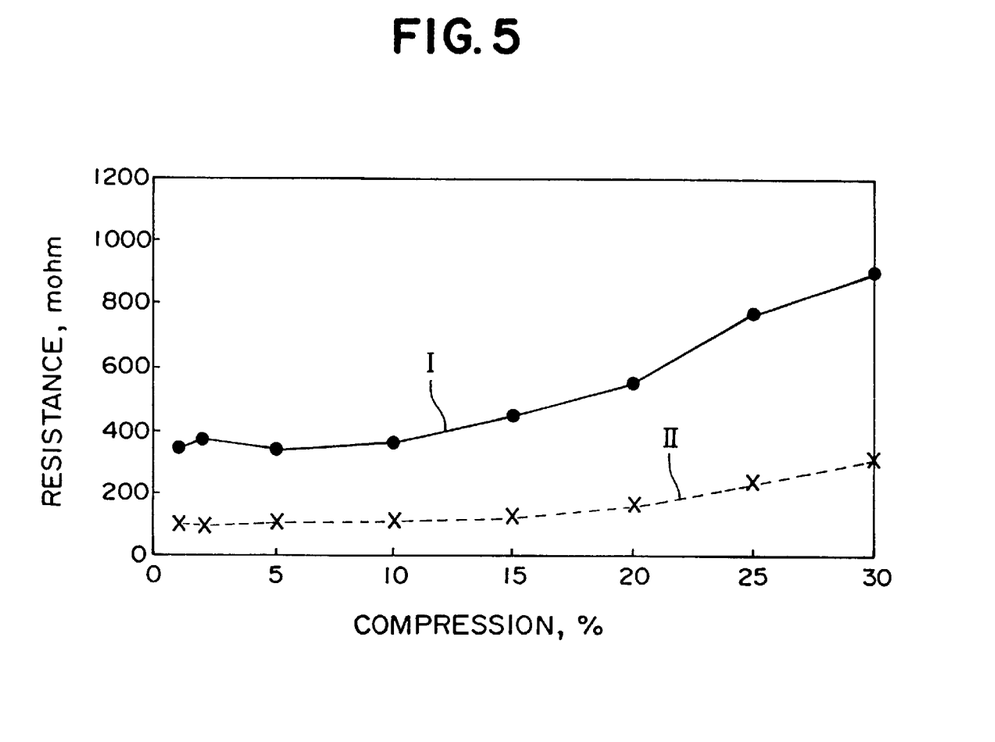
FIG. 5 is a graph showing the continuity resistance by using the inventive low-resistance interconnectors prepared in Examples as a function of % compression.

The above obtained low-resistance interconnector was tested for the continuity resistance between electrode terminals sandwiching the interconnector in the same manner as in Example 1 to find a value of 100 mohm of the continuity resistance and the value was most stable when the compression of the conductive layer 3 is in the range from 2 to 15%. Curve II in FIG. 5 shows the continuity resistance in this case as a function of % compression. The maximum tolerable current passing through the conductive layer was 200 mA between a pair of electrode terminals.

What is claimed is:

1. A low-resistance interconnector which is an integral elongated strip of a sheet having flat surfaces consisting of three elongated sectional parts conjoined together side-by-side to form the flat surfaces of the sheet including two side sectional parts and one center sectional part sandwiched between the side sectional parts, the side sectional parts being made each from an electrically insulating rubbery elastomer and the center sectional part being a composite body consisting of an electrically insulating adhesive as a matrix and a plurality of electroconductive elements embedded in the matrix each in parallel to the others arranged in an array running in the direction substantially perpendicular to the flat surfaces of the strip of sheet at a regular pitch and made from an electroconductive polymeric composition comprising a polymeric matrix and silver particles dispersed therein and having a volume resistivity in the range from $2\times10^{-4}$ to $5\times10^{-4}$ ohm.cm at room temperature.

2. The low-resistance interconnector as claimed in claim 1 in which the electrically insulating rubbery elastomer is a silicone rubber.

3. The low-resistance interconnector as claimed in claim 1 in which the electroconductive polymeric composition comprises from 300 to 400 parts by weight of silver particles per 100 parts by weight of the polymeric matrix.

4. The low-resistance interconnector as claimed in claim 1 in which the silver particles have a particle diameter in the range from 0.1 $\mu$m to 10 $\mu$m.

5. A method for the preparation of a low-resistance interconnector which comprises the steps of:

(a) forming, on one surface of a first sheet of an electrically insulating rubbery elastomer, an array of stripes at a regular pitch made from an electroconductive polymeric composition comprising a polymeric matrix and silver particles dispersed therein and having a volume resistivity in the range from $2\times10^{-4}$ to $5\times10^{-4}$ ohm.cm at room temperature;

(b) coating the surface of the first sheet of an electrically insulating rubbery elastomer and the array of the parallel stripes made from an electroconductive polymeric composition thereon altogether with an electrically insulating adhesive to form a layer consisting of the electrically insulating adhesive as a matrix and the stripes made from the electroconductive polymeric composition embedded therein to form a two-layered composite sheet;

(c) overlaying and adhesively bonding a second sheet of an electrically insulating rubbery elastomer on and to the surface of the layer consisting of the electrically insulating adhesive as a matrix and the stripes made from the electroconductive polymeric composition on the first sheet of the electrically insulating rubbery elastomer to form a three-layered composite sheet; and (d) slitting the three-layered composite sheet in planes substantially perpendicular to the running direction of the stripes made from the electroconductive polymeric composition into elongated strips.

6. A low-resistance interconnector which is an integral elongated strip of a sheet having flat surfaces consisting of three elongated sectional parts conjoined together side-by-side to form the flat surfaces of the sheet including two side sectional parts and one center sectional part sandwiched between the side sectional parts, the side sectional parts being made each from an electrically insulating rubbery elastomer and the center sectional part being a composite body consisting of an electrically insulating adhesive as a matrix and a plurality of electroconductive elements embedded in the matrix each in parallel to the others arranged in two arrays in such a fashion that each of the electroconductive elements in one of the arrays just faces one of the electroconductive elements in the other array running in the direction substantially perpendicular to the flat surfaces of the strip of sheet at a regular pitch and made from an electroconductive polymeric composition comprising a polymeric matrix and silver particles dispersed therein and having a volume resistivity in the range from $2\times10^{-4}$ to $5\times10^{-4}$ ohm.cm at room temperature.

7. The low-resistance interconnector as claimed in claim 6 in which the electrically insulating rubbery elastomer is a silicone rubber.

8. The low-resistance interconnector as claimed in claim 6 in which the electroconductive polymeric composition comprises from 300 to 400 parts by weight of silver particles per 100 parts by weight of the polymeric matrix.

9. The low-resistance interconnector as claimed in claim 6 in which the silver particles have a particle diameter in the range from 0.1 $\mu$m to 10 $\mu$m.

10. A method for the preparation of a low-resistance interconnector which comprises the steps of:

(a) forming, on one surface of each of a first and second sheets of an electrically insulating rubbery elastomer, an array of stripes at a regular pitch made from an electroconductive polymeric composition comprising a polymeric matrix and silver particles dispersed therein and having a volume resistivity in the range from $2\times10^{-4}$ to $5\times10^{-4}$ ohm.cm at room temperature;

(b) coating the surface of each of the first and second sheets of an electrically insulating rubbery elastomer and the array of parallel stripes made from an electroconductive polymeric composition thereon altogether with an electrically insulating adhesive to form a layer consisting of the electrically insulating adhesive as a matrix and the stripes made from the electroconductive polymeric composition to form a first and second two-layered composite sheets;

(c) overlaying the first and second two-layers composite sheets one on the other and bonding the composite sheets together at the surfaces of the respective layers consisting of the electrically insulating adhesive as a matrix and the stripes made from the electroconductive polymeric composition to form a multilayered composite sheet in such a fashion that each of the electroconductive stripes on the first two-layered composite sheet just faces one of the electroconductive stripes on the second two-layered composite sheet; and (d) slitting the multilayered composite sheet in planes substantially perpendicular to the running direction of the stripes made from the electroconductive polymeric composition into elongated strips.

* * * * *